United States Patent [19]

Lauterbach et al.

[11] Patent Number: 4,457,169

[45] Date of Patent: Jul. 3, 1984

[54] APPARATUS FOR MEASURING THE MASS OF A FLOWING MEDIUM

[75] Inventors: Heinz Lauterbach, Esslingen; Jörg Widera, Stuttgart, both of Fed. Rep. of Germany

[73] Assignee: Robert Bosch GmbH, Stuttgart, Fed. Rep. of Germany

[21] Appl. No.: 382,454

[22] Filed: May 24, 1982

[30] Foreign Application Priority Data

Jun. 25, 1981 [DE] Fed. Rep. of Germany ....... 3124960

[51] Int. Cl.$^3$ .............................................. G01F 1/68
[52] U.S. Cl. ........................................ 73/202; 73/204
[58] Field of Search ..................... 73/202, 204, 861.61, 73/861.62, 861.63, 861.64, 118 A

[56] References Cited

U.S. PATENT DOCUMENTS 3,374,673  3/1968  Trageser ............................. 73/204
4,317,365  3/1982  Lauterbach ......................... 73/204

FOREIGN PATENT DOCUMENTS 2041536  9/1980  United Kingdom ................. 73/204

Primary Examiner—Herbert Goldstein
Attorney, Agent, or Firm—Edwin E. Greigg

[57] ABSTRACT

An apparatus is proposed for measuring the mass of a flowing medium in an air intake tube, in particular, for measuring the aspirated air mass of internal combustion engines. The apparatus has at least one temperature-dependent resistor disposed in the flow of the medium, whose temperature and/or resistance is regulated in accordance with the mass of the medium; the adjustment variable serves as a measurement standard for the mass of the medium. The temperature-dependent resistor is disposed in a gap extending parallel to the flow of the medium, and a deflecting body bridging that gap is disposed upstream of the gap. In orer to prevent soiling of the temperature-dependent resistor inlet conduits for the flow of medium to the gap are provided downstream of the maximum cross section of the deflecting body and these inlet conduits discharge into the gap at an acute angle.

5 Claims, 2 Drawing Figures

APPARATUS FOR MEASURING THE MASS OF A FLOWING MEDIUM

BACKGROUND OF THE INVENTION

The invention is directed to an apparatus for measuring the mass of a flowing medium wherein a temperature-dependent resistor is disposed axially of the flow. An apparatus is already known in which such a temperature-dependent resistor is disposed in a gap parallel to the flow, and a portion of the medium flows past this gap. However, there is the danger that particles contained in the medium will be deposited on the temperature-dependent resistor and cause an undesirable change in the characteristic curve in the apparatus for measuring the mass; in other words, incorrect measurement values will be produced.

OBJECT AND SUMMARY OF THE INVENTION

It is a principal object of the apparatus for measuring the mass of a flowing medium according to the invention to have the advantage over the prior art that soiling of the temperature-dependent resistor is substantially avoided.

It is another object of the invention to provide a temperature-dependent resistor disposed downstream from a deflecting body having low resistance to the flow of the medium past it.

It is yet another object of the invention for the temperature-dependent resistor to be disposed in a region of stabilized medium flow.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
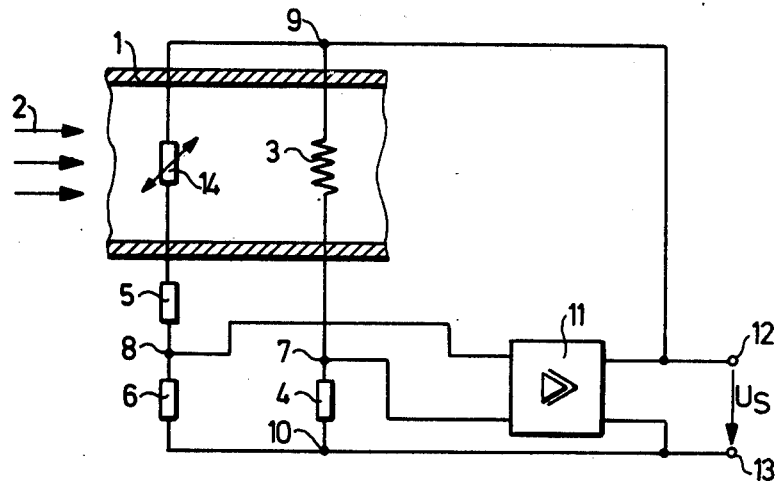
FIG. 1 shows a basic circuit diagram of an apparatus for measuring the mass of a flowing medium having a temperature-dependent resistor.

In FIG. 1, an intake tube of an internal combustion engine not otherwise shown and serving as a flow cross section is marked by reference numeral 1; the air aspirated by the engine flows within this tube in the direction of the arrows 2. A temperature-dependent resistor 3, for instance, a hot-coated or hot-film resistor or a hot wire, is located in the intake tube 1 subject to the flow through it of the output variable of a regulator, simultaneously furnishing the input variable for the regulator. The temperature of the temperature-dependent resistor 3 is adjusted by the regulator to a pre-set value, which is above the average air temperature. If the flow speed, or in other words the quantity of air aspirated per unit of time, increases then the temperature-dependent resistor 3 cools down to a proportional extent. This cooldown of the resistor is fed back to the input of the regulator, so that the regulator increases its output variable to such an extent that the pre-set temperature value is reestablished at the temperature-dependent resistor 3. The output variable of the regulator regulates the temperature of the temperature-dependent resistor 3 when there are changes in the quantity of aspirated air to the given predetermined value; it simultaneously represents a standard for the quantity of aspirated air, which is delivered as a measurement variable to a metering circuit of the engine in order to adapt the required quantity of fuel to the quantity of air aspirated per unit of time.

The temperature-dependent resistor 3, together with a resistor 4, forms a first bridge branch, and a second bridge branch is switched parallel to it, comprising the two fixed resistors 5 and 6. The pick-up point 7 is located between the resistors 3 and 4, and the pick-up point 8 is located between the resistors 5 and 6. The two bridge branches are switched parallel at points 9 and 10. The diagonal voltage of the bridge appearing between points 7 and 8 is delivered to the input of the amplifier 11, then to the output terminals 12. 13 at which location pick-up points 9 and 10 are connected, so that its output variable supplies the bridge with operating voltage or operating current. The output variable designated as the adjusting variable $U_s$ can be picked up between the terminals 12 and 13, as indicated in FIG. 1. The adjustment variable $U_s$ controls the metering of fuel required for the aspirated air quantity in a fuel metering circuit of the engine, not shown. The temperature-dependent resistor 3 is heated by the current flowing through it up to a value at which the input voltage of the amplifier 11, that is, the bridge diagonal voltage, becomes zero, or assumes a predetermined value. A specific current then flows from the output of the amplifier into the bridge circuit. If a change in the quantity of aspirated air changes the temerature of the temperature-dependent resistor 3, then the voltage at the bridge diagonal also changes, and the amplifier 11 regulates the operating voltage or current to the bridge to a value at which the bridge is again balanced or is unbalanced in a given manner. The output variable of the amplifier 11, the control voltage $U_s$, thus like the current in the temperature-dependent resistor 3 serves as a standard for the quantity of aspirated air.

Figure 2:
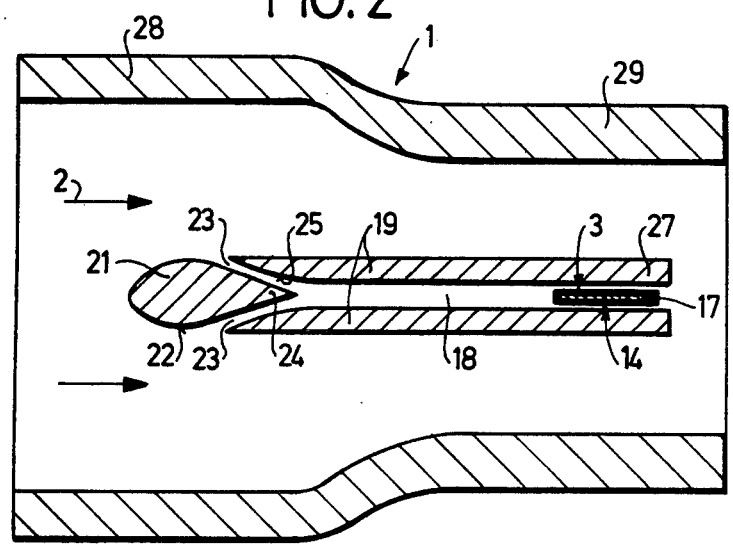
FIG. 2 shows a preferred embodiment of an apparatus for measuring the mass of a flowing medium according to the invention.

In order to compensate for the unfluence of the temperature of the aspirated air on the result of mesurement, it may be desirable to switch a second resistor 14, which is surrounded by the flow of aspirated air, into the second bridge branch. The size of the resistors 5, 6 and 14 should be selected such that the power loss of the temperature-dependent resistor 14, caused by the branch current flowing through it, is so small that the temperature of this resistor 24 virtually does not vary with variations in the bridge voltage, but instead always corresponds to the temperature of the aspirated air flowing past it. In FIG. 2, the temperature-dependent resistor 3 comprises a hot-coated or hot film resistor applied to one side of a carrier 17 by a known method. The second temperature-dependent resistor 14 may likewise comprise a film or a coating applied to the other side of the carrier 17. If the carrier 17 is an electrically conductive material, then an insulating layer should be provided between each of the electric resistors 3, 14 and the carrier 17. The carrier 17 with the temperature-dependent resistors 3, 14 is provided in a gap 18 formed within a body 19 having the least possible flow resistance. The carrier 17 is disposed so as to extend in the direction 2 parallel to the flow. The gap 18 is designed such that a laminar flow prevails within it without splitting off. A deflecting body 21 is disposed in the direction of flow preceding the gap 18 and adjacent the body 19 so as to be located in the axis of symmetry of the gap 18. This deflecting body 21 bridges the gap 18 downstream of the widest cross section 22 of the deflecting body 21, so that at least one inlet conduit 23 is provided for the flow of medium into the gap 18. The deflecting body 21 is preferably tear-drop-shaped and should present the least possible resistance to the flow of the medium. The inlet conduits 23 discharge into the gap 18 at an acute angle, directed counter to the flow of the medium, and may comprise a region within the body 19 or, as shown in FIG. 2, between the surfaces of that portion of the deflecting body part indicated at 24, remote from the flow, and a conically extending inlet wall 25 of the body 19 partially enclosing the deflecting body portion 24. Upstream of the inlet conduits 23, the flow of medium undergoes deflection at the deflecting body 231, and the undesirable particles contained in the medium necessary follow along, with the result that these particles, because of their sluggishness, circumvent the inlet conduits 23 without making another deflection into the inlet conduits 23. As a result, the flow of medium reaching the gap via the inlet conduits 23 is free of undesirable particles, so that no deposits form on the carrier 17 or on the temperature-dependent resistors 3, 14. The carrier 27 having the temperature-dependent resistors 3, 24 is advantageously disposed in a region of stabilized flow in an end 27 of the body 19 remote from the deflecting body 21. An increase in the flowthrough quantity through the gap 18 can be attained by increasing the pressure drop in the medium by locating the inlet conduits 23 i a region 28 of enlarged diameter relative to a region 29 wherein end 27 is located within the intake tube.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for measuring mass of a medium flowing through a flow cross section, in particular for measuring an air mass aspirated by an intake tube of an internal combustion engine, provided with means defining a gap having at least one temperature-dependent resistor therein extending parallel to flow of the medium, said air mass serving to regulate selectively a variable characteristic of the temperature-dependent resistor to serve as a standard for said mass of medium, characterized in that a deflecting body having a variable cross-section is disposed upstream of said means defining the gap and the deflecting body defines with said means at least one inlet conduit for said medium to flow into the gap downstream of a maximum cross-section of the deflecting body.

2. An apparatus as defined by claim 1, further characterized in that the deflecting body comprises a tear-drop-shaped member which presents low resistance to the flow of the medium.

3. An apparatus as defined by claim 2, further characterized in that said means defining a gap includes walls having a longitudinal extent and said deflecting body is provided with a portion adjacent said walls and partially encompassed thereby, said walls and said portion further defining said at least one inlet conduit at an acute angle.

4. An apparatus as defined by claim 1, further characterized in that said temperature-dependent resistor is disposed in a region of stabilized medium flow within said means defining a gap and at an extremity thereof remote from the deflecting body.

5. An apparatus as defined by one of the foregoing claims, further characterized in that said cross-section includes a first upstream region of enlarged diameter relative to a second downstream region, said inlet conduit being disposed in said first upstream region, said resistor being disposed in an extremity of said means defining a gap lying in said second downstream region.

* * * * *